UNITED STATES PATENT OFFICE 2,014,823

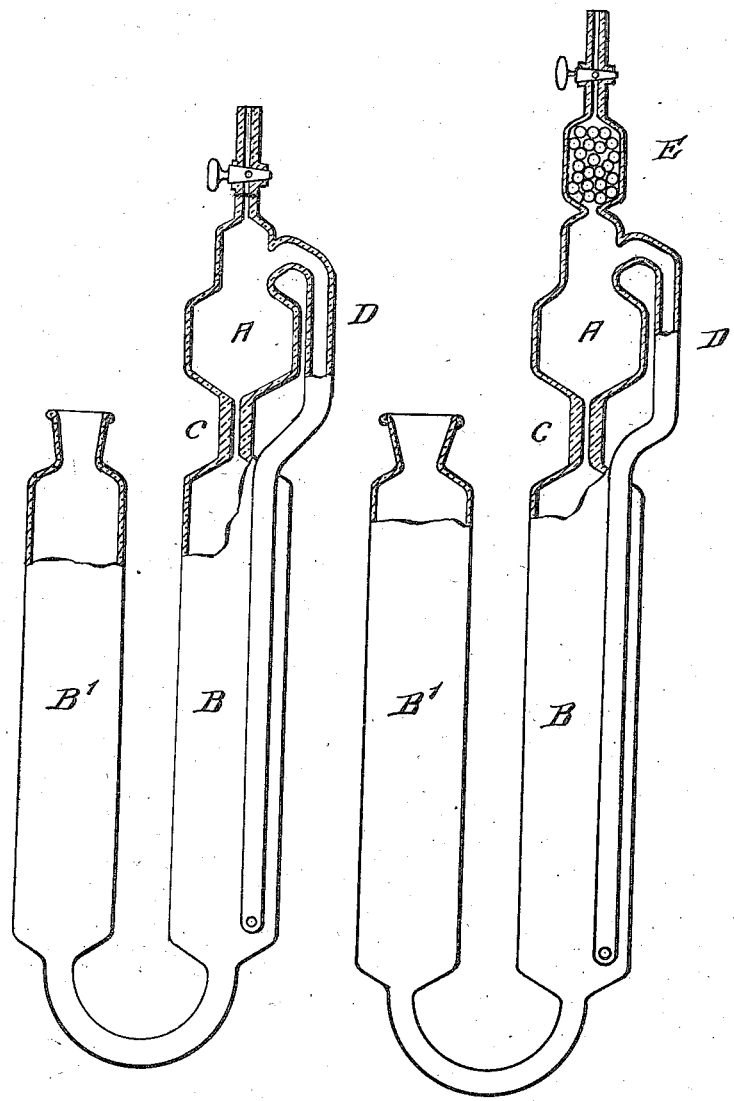

ABSORPTION VESSEL FOR GASES AND VAPORS

Heinrich Tramm, Oberhausen-Holten, Germany

Application August 10, 1932, Serial No. 628,213
In Germany August 13, 1931

3 Claims. (Cl. 23—253)

Absorption vessels for gases and vapors are known in which the gas to be examined is forced through the absorption liquid, for the purpose of intensive washing, as in the case with a washing flask, by the use of a dipping tube. These absorption vessels are so constructed that the return path for the gas is closed by the liquid itself during the forcing operation. These pipettes are constructed as a vessel divided into two compartments by an interposed bottom provided at right-angles to the axis of the vessel. This interposed bottom is perforated by two holes; through one hole the dipping tube extends to the bottom of the lower compartment and a second hole is in the form of a short capillary U-tube. These pipettes have the advantage over other constructions that they permit of a double washing and avoid the use of valves. They have, however, the very considerable disadvantage that when a number of absorption liquids are being used, such for example as mercury cyanide in an alkaline solution for testing acetylene and other liquids, sludge like residues form in the upper part of the vessel as the latter has not its outlet at the lowermost position. The result is that the capillary tube quickly chokes. The utility of these pipettes is, therefore limited. Furthermore these absorption pipettes have the disadvantage that they are difficult to make as it is one of the most difficult problems in the glass industry to produce the extended fused joints that are necessary.

The absorption pipette according to the present invention avoids these disadvantages. Two constructions of the new pipette are illustrated in the accompanying drawing.

In the construction represented in Figure 1 of the drawing the pipette according to the invention consists of two separate vessels A and B which are in communication one with the other, on the one hand by the capillary tube C and on the other hand by the immersion tube D. In accordance with the Orsat principle the vessel B is connected to a reserve vessel $B^1$ into which part of the washing liquid contained in the vessel B may be displaced upon the entry of the gas under treatment into the vessel B. When the gas is forced into the pipette from the measuring apparatus it flows through the tube D into the vessel B and passes through the liquid therein, a washing being given to it similar to that given to a gas in a washing flask. At the same time a fine stream of liquid passes from the liquid contents of the vessel A through the capillary tube C into the vessel B. The diameter of the immersion tube D and the diameter of the capillary C are in such relationship that the total volume of gas to be treated is passed through the immersion tube D into the vessel B while the liquid contents in the vessel A are flowing away to the extent of half the volume. There is thus no passageway for gas through the capillary tube as its resistance is so calculated that it is always closed by the presence of liquid when gas was forced into the pipette. If the vessel B be filled with glass beads, this has the advantage that while the gas is being forced in, the beads are all the time sprayed from the capillary tube with fresh washing liquid. When the gas is drawn back into the measuring apparatus, the tube D is at once closed by the washing liquid as in the case of a manometer and the gas leaves the pipette through the capillary tube C, and at the same time it is again washed in the vessel A by the liquid therein. The washing liquid in this vessel is renewed with each washing. A flow of liquid from A to B takes place when the gas is forced in and immediately all the gas has passed through A from B, the vessel A fills up through the manometer tube D with washing liquid as far as the mark or as for as a non-return valve. This form furthermore enables the vessel A to be divided up by a number of superposed balls in order to secure a still more intensive washing action. Such division is not possible in any known type of apparatus. The advantages of the pipette according to the invention over the known types of pipette are:—

1. A multiplication of the washing action in a unit of the absorption period as the gas is washed on the forward flow and on the return flow.
2. Where the washing space is filled with beads a further increase is obtained in the washing action as the beads are continuously sprayed upon by fresh absorption liquid.
3. The elimination of all valves within the liquid.

The absorption vessel described can be improved upon, as represented in Figure 2, by providing above the vessel B one or more substantially spherical vessels E filled with glass beads. By the provision between the vessel B and the outlet capillary tube of one or more extension vessels filled with glass balls or similar bodies, the stream of gas which passes through the tube D into the absorption vessel B is prevented, when rapidly withdrawn, from raising liquid out of the vessel B, which liquid is forced into the discharge capillary tube above the vessel A and carried along by the stream of gas. Furthermore the advantage is secured that in the extension vessels filled with glass balls there is a further washing of the gas during its entry and exit, so that the gas is washed altogether four times in its single passage through the pipette, namely first as it passes in through the chamber filled with beads above the absorption vessel A, secondly during its passage through the washing column in B, thirdly as it flows through the vessel A on the return passage of the gas, and fourthly on its discharge from the chamber filled with beads above A. Where the washing action is thus considerably increased the pipette can operate very rapidly and effectively.

I claim:—

1. An apparatus for the absorption of gases, operating on the Orsat principle, comprising two communicating main vessels of which one serves as the gas absorption vessel and the second for the reception of the liquid displaced in the first by the gas during the absorption operation, an ante-absorption vessel for containing washing liquid provided above the gas-absorption vessel, a capillary passage connecting the said vessels, means for connecting the ante-absorption vessel with the source of supply of gas, and an immersion tube extending from the upper part of the ante-absorption vessel to the bottom of the gas-absorption vessel below it, the internal diameter of the immersion tube being considerably greater than the diameter of the capillary passage to ensure the passage of a part of the washing liquid in the ante-absorption vessel into the gas-absorption vessel during the absorption of gas and the return of the unabsorbed gas through the liquid remaining in the ante-absorption vessel with the source of supply of gas being by way of the ante-absorption vessel.

2. An apparatus for the absorption of gases, operating on the Orsat principle, comprising two communicating main vessels of which one serves as the gas-absorption vessel and the second for the reception of the liquid displaced in the first by the gas during the absorption operation, an ante-absorption vessel for containing washing liquid provided above the gas-absorption vessel, a capillary passage connecting the said vessels, means for connecting the ante-absorption vessel with the source of supply of gas, an immersion tube extending from the upper part of the ante-absorption vessel to the bottom of the gas-absorption vessel below it, and an extension vessel above the ante-absorption vessel, the internal diameter of the immersion tube being considerably greater than the diameter of the capillary passage to ensure the passage of a part of the washing liquid in the ante-absorption vessel into the gas-absorption vessel during the absorption of gas and the return of the unabsorbed gas through the liquid remaining in the ante-absorption vessel.

3. An apparatus for the absorption of gases, operating on the Orsat principle, comprising two communicating main vessels of which one serves as the gas-absorption vessel and the second for the reception of the liquid displaced in the first by the gas during the absorption operation, an ante-absorption vessel provided above the gas-absorption vessel, a capillary passage connecting the said vessels, an immersion tube extending from the upper part of the ante-absorption vessel to the bottom of the gas-absorption vessel below it, and a plurality of extension vessels arranged successively above the ante-absorption vessel, the internal diameter of the immersion tube being considerably greater than the diameter of the capillary passage and the connection of the gas-absorption vessel with the source of supply of gas being by way of the ante-absorption vessel and the extension vessels.

HEINRICH TRAMM.